United States Patent [19]

Marten

[11] Patent Number: 4,618,648
[45] Date of Patent: Oct. 21, 1986

[54] COPOLYMERS OF VINYL ALCOHOL AND POLY(ALKYLENEOXY)ACRYLATES

[75] Inventor: Finn L. Marten, Macungie, Pa.

[73] Assignee: Air Products and Chemicals, Inc., Allentown, Pa.

[21] Appl. No.: 727,638

[22] Filed: Apr. 26, 1985

[51] Int. Cl.$^4$ .............................. C08F 16/06
[52] U.S. Cl. .................................... 525/60
[58] Field of Search ............................ 525/60

[56] References Cited

U.S. PATENT DOCUMENTS

| | | | |
|---|---|---|---|
| 1,971,662 | 12/1930 | Schmidt et al. | 260/2 |
| 2,290,600 | 6/1930 | Neher et al. | 260/34 |
| 2,654,717 | 10/1953 | Rehberg et al. | 260/23 |
| 2,844,570 | 7/1958 | Broderick | 260/91.3 |
| 2,990,398 | 7/1958 | Inskip et al. | 260/91.3 |
| 3,033,841 | 5/1962 | Germain | 525/60 |
| 3,083,172 | 3/1963 | Scott et al. | 525/60 |
| 3,203,918 | 8/1965 | Goldberg et al. | 525/60 |
| 3,218,281 | 11/1965 | Rees | 525/60 |
| 3,300,546 | 1/1967 | Baechtold | 525/60 |
| 3,896,161 | 7/1975 | Borden et al. | 260/486 |
| 4,075,411 | 2/1978 | Dickstein | 260/486 R |
| 4,268,641 | 5/1981 | Koenig et al. | 525/367 |
| 4,369,281 | 1/1983 | Zimmermann et al. | 524/379 |
| 4,390,401 | 6/1983 | Costanza | 204/159.24 |
| 4,463,151 | 7/1984 | Schulz | 526/307.5 |

FOREIGN PATENT DOCUMENTS

| | | | |
|---|---|---|---|
| 56-29489 | 8/1971 | Japan | 525/60 |
| 0206607 | 12/1983 | Japan | 525/60 |
| 922459 | 4/1963 | United Kingdom | 525/60 |

OTHER PUBLICATIONS

Patent Application Publication Koho No.: 1984—[Showa 59]—155, 408, Process for Producing Modified Polyvinyl Acetates (English Translation), pp. 1–11.
Patent Application Publication Koho No.: 1984—[Showa 59]—155, 411-Process for Producing Modified Vinyl Acetate Resins (English Translation), pp. 1–11.

*Primary Examiner*—Joseph L. Schofer
*Assistant Examiner*—J. M. Reddick
*Attorney, Agent, or Firm*—Michael Leach; James C. Simmons; E. Eugene Innis

[57] ABSTRACT

A vinyl alcohol copolymer comprising the following general structure:

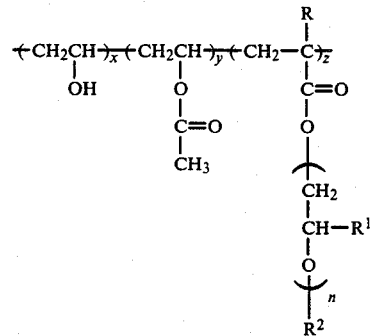

wherein
R is hydrogen or methyl;
$R^1$ is hydrogen or methyl;
$R^2$ is hydrogen, $C_1$–$C_{20}$ alkyl, $C_6$–$C_{20}$ aryl or $C_7$–$C_{30}$ alkylaryl;
n is a number from 1–1,000;
x is 50–99.9 mole %;
y is 0–50 mole %; and z is 0.001–50 mole %.

19 Claims, No Drawings

COPOLYMERS OF VINYL ALCOHOL AND POLY(ALKYLENEOXY)ACRYLATES

TECHNICAL FIELD

The present invention relates to vinyl alcohol polymers and, more particularly, the invention relates to copolymers of vinyl alcohol with a poly(alkyleneoxy)acrylate.

BACKGROUND OF THE INVENTION

The end uses of vinyl alcohol polymers have been limited despite excellent strength, adhesive and barrier properties. This limitation is partly due to the fact that unplasticized vinyl alcohol polymers show little or no thermoplasticity before the occurrence of decomposition. Resolution of this problem has been sought through the use of external plasticizers such as ethylene glycol, trimethylene glycol, propylene glycol, triethylene glycol, neopentyl glycol and 2,2,4-trimethyl-1,3-pentane diol. However, the use of external plasticizers presents several disadvantages including increased moisture sensitivity, decreased tensile strength, leaching of the plasticizer and decreased gas barrier properties.

The internal plasticization of polyvinyl alcohol through the use of comonomers, grafting or post reactions is known in the art. For example, the ethyleneoxylation (hydroxyethylation) of polyvinyl alcohol produces a permanently flexible, internally plasticized type of polyvinyl alcohol (see U.S. Pat. Nos. 2,990,398; 1,971,662 and 2,844,570). The ethyleneoxy groups, which are introduced by reaction of ethylene oxide with the polyvinyl alcohol, are chemically bound to the product and therefore are not removable by physical methods such as evaporation, migration or extraction. In addition, the modified polyvinyl alcohol retains its water solubility, strength and flexibility.

The preparation of modified polyvinyl alcohols through the solvolysis of a graft copolymer of vinyl acetate onto polyalkylene glycols is known. (See U.S. Pat. Nos. 3,033,841 and 4,369,281). These products are water soluble and thermoplastically workable.

The internal plasticization of polyvinyl alcohol through the use of ethylene as a comonomer produces a thermoplastic but water insoluble resin.

U.S. Pat. No. 2,290,600 discloses vinyl alcohol copolymers prepared from copolymers of vinyl esters with acrylic or methacrylic esters by converting the vinyl ester part of the copolymer into vinyl alcohol units under conditions whereby the acrylic methacrylic part is not converted into acrylic or methacrylic acid units, respectively. Among the numerous acrylic and methacrylic esters suggested for use in the invention is beta-ethoxyethyl ester.

U.S. Pat. No. 2,654,717 discloses the polymerization of mono-unsaturated vinylic monomers containing at least one oxygen atom linked to carbon atoms (an ether linkage) including, for example, monomeric compounds corresponding to the general formula.

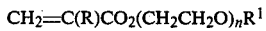
$$CH_2=C(R)CO_2(CH_2CH_2O)_nR^1$$

where R is hydrogen or methyl, $R^1$ aryl, aralkyl or alkyl group and n is one or two.

U.S. Pat. No. 3,203,918 discloses copolymers of vinyl alcohol and the beta-hydroxyalkyl acrylate esters wherein the alkyl group of the beta-hydroxyalkyl acrylate esters may contain from two to four carbon atoms. The copolymers are prepared by the polymerization and subsequent alcoholysis of copolymers of vinyl acetate and the beta-hydroxyalkyl acrylate esters. Films and coatings of such copolymers are characterized by their ability to remain soft and flexible in the absence of plasticizers.

U.S. Pat. No. 4,075,411 discloses vinyl-polymerizable monomers having surfactant properties comprising the esters of acrylic, methacrylic and crotonic acids with $C_8$–$C_{20}$ alkyl phenoxy(ethyleneoxy)$_{10-60}$ ethyl alcohols. There is disclosed a method of making emulsion copolymers which comprises reacting one or more main vinyl-polymerizable monomers with from about 1–10 wt% of at least one of the surfactant esters. For example, an emulsion copolymer comprised polyvinyl acetate having copolymerized herein about 4% by weight of the acrylate ester of a nonylphenoxy poly(ethyleneoxy)ethyl alcohol.

U.S. Pat. No. 4,463,151 discloses water soluble copolymers of acrylamide and alkyl or alkylaryl poly(ethyleneoxy) acrylate.

SUMMARY OF THE INVENTION

The present invention provides a class or vinyl alcohol coploymers having the following general formula I.

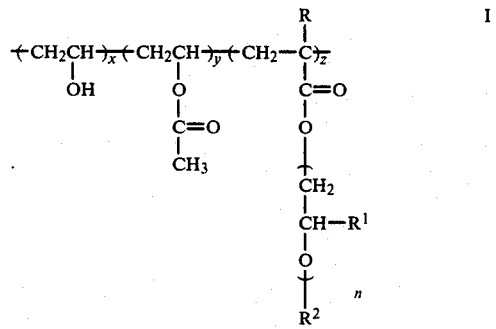

where
R is hydrogen or methyl;
$R^1$ is hydrogen or methyl;
$R^2$ is hydrogen, $C_1$–$C_{20}$ alkyl, $C_6$–$C_{20}$ aryl or $C_7$–$C_{30}$ alkylaryl;
n is a number from 1–1,000;
x is 50–99.9 mole%;
y is 0–50 mole% and
z is 0.001–50 mole%.

The process for preparing the copolymers comprises (a) continuously feeding vinyl acetate monomer and a poly(alkyleneoxy)acrylate monomer to a reaction mixture in a reaction vessel, (b) polymerizing the vinyl acetate and poly(alkyleneoxy)acrylate monomer to yield a copolymer in the reaction mixture, (c) continuously withdrawing from the reaction vessel reaction mixture containing the copolymer, and (d) hydrolyzing the acetate functionality of the copolymer to yield a vinyl alcohol copolymer.

Desirably, steps (a)–(c) are performed in such a manner as to attain a steady state condition in the reaction vessel.

The copolymers of the invention are easy to prepare in existing polyvinyl alcohol production equipment and offer a polymer having good thermoplastic and thermal stability properties. The copolymers for the most part retain the water solubility and strength of the polyvinyl alcohol and have an added flexibility.

It is believed that the long polyalkylene oxide side chains act as plasticizers at increased temperatures whereas a phase separation on a molecular scale occurs at lower temperatures leading to a polymer matrix of polyvinyl alcohol and alkylene oxide rich domains. This matrix is believed to result in amorphous and crystalline domains where the crystalline areas contribute to good gas barrier properties.

DETAILED DESCRIPTION OF THE INVENTION

The invention provides a modified polyvinyl alcohol composition comprising a copolymer of vinyl alcohol, vinyl acetate and a poly(alkyleneoxy)acrylate comonomer of general formula II.

$$CH_2=\overset{R}{\underset{|}{C}}-\overset{O}{\underset{||}{C}}-O+CH_2\overset{R^1}{\underset{|}{CHO}}\!\!\!\to_{\overline{n}} R^2 \qquad II$$

where
R represents H or $CH_3$; preferably $CH_3$;
$R^1$ represents H or $CH_3$;
$R^2$ represents H, $C_1$–$C_{20}$ alkyl, $C_6$–$C_{20}$ aryl or $C_7$–$C_{30}$ alkylaryl and
n represents a number from 1–1,000; preferably 3–100; and most preferably 5–50.

The comonomers of formula II are the poly(ethyleneoxy) or poly(propyleneoxy)ester derivatives of an acrylic acid, namely acrylic acid or methacrylic acid. These acrylate ester comonomers can terminate in a free hydroxyl group or be end-capped with a $C_1$–$C_{20}$ alkyl group such as methyl, ethyl, butyl, octyl, dodecyl and the like; a $C_6$–$C_{20}$ aryl group such as phenyl, naphthyl and the like; or a $C_7$–$C_{30}$ alkylaryl group such as tolyl, methylnaphthyl, nonylphenyl, and the like. It is preferred that $R^2$ be hydrogen or a $C_1$–$C_{20}$ alkyl, especially a $C_4$–$C_{12}$ alkyl.

However, $R^2$ should be a $C_3$–$C_{20}$ alkyl, $C_6$–$C_{20}$ aryl or $C_7$–$C_{30}$ alkylaryl group when n is 1. In other words, when the acrylate moiety contains one alkyleneoxy group, $R^2$ should not be hydrogen, methyl or ethyl.

It is preferred to use the methacrylate esters, i.e. R is $CH_3$, because of their stability under alcoholysis conditions.

When $R^1$ is methyl, i.e. when the acrylate monomer contains propyleneoxy units, it is possible that the methyl group could be on the adjacent carbon atom depending upon the synthesis route used to prepare the methacrylate ester monomer.

Many of the poly(alkyleneoxy) (meth)acrylate comonomers are commercially available from Alcolac, Inc., Baltimore, MD or can be prepared according to the teachings in U.S. Pat. Nos. 3,896,161; 4,075,411; 4,268,641; and 4,390,401. The comonomers can also be prepared with blocks of ethyleneoxy units followed by propyleneoxy units or a random mixture of both.

The polymers of the invention are prepared by a free radical process using a train of continuous stirred tank reactors followed by a hydrolysis, or alcoholysis, reaction. Vinyl acetate, acrylate comonomer, free radical catalyst and methanol are added continuously to the first reactor. The acrylate comonomer can be added to subsequent reactors in order to maintain a homogeneous copolymer.

Unreacted vinyl acetate is removed from the exit stream by contacting it with methanol vapors in a stripping column yielding an intermediate vinyl acetate random copolymer having the general formula III.

$$+CH_2CH\!\!\!\to_{\overline{x+y}}+CH_2-\overset{R}{\underset{|}{C}}\!\!\!\to_{\overline{z}}$$
$$\underset{|}{O} \qquad\qquad \underset{|}{C=O}$$
$$\underset{|}{C=O} \qquad\qquad \underset{|}{O}$$
$$\underset{|}{CH_3} \qquad\qquad \underset{|}{CH_2}$$
$$\qquad\qquad\qquad \underset{|}{CH-R^1}$$
$$\qquad\qquad\qquad \underset{|}{O}$$
$$\qquad\qquad\qquad \Big\}_n$$
$$\qquad\qquad\qquad R^2$$

where
R is hydrogen or methyl;
$R^1$ is hydrogen or methyl;
$R^2$ is hydrogen, $C_1$–$C_{20}$ alkyl, $C_6$–$C_{20}$ aryl or $C_7$–$C_{30}$ alkylaryl;
n is a number from 1–1,000;
x is 50–99.9 mole%;
y is 0–50 mole% and
z is 0.001–50 mole%.

The alcoholysis of the intermediate vinyl acetate copolymer is effected by the addition of a base catalyst. The resulting product is washed with methanol and dried to yield the vinyl alcohol/poly(alkyleneoxy)acrylate copolymer of formula I, where R, $R^1$, $R^2$, n, x, y and z are as defined above.

In the preferred embodiment of the copolymers of the invention, n ranges from 3–100, x ranges from 75–99.5 mole%, y ranges from 0–25 mole% and z ranges from 0.005–25 mole%. In the most preferred embodiment n is from 5–50, x is from 85–99 mole%, y is from 0–15 mole% and z is from 0.005–15 mole%.

The degree of polymerization of the copolymers of this invention can range from about 100 up to 3,000 but is preferably 200 to 800.

The vinyl alcohol/poly(alkyleneoxy)acrylate copolymers of the present invention can be prepared by the following process:

The vinyl acetate/poly(alkyleneoxy)acrylate copolymers are prepared by the use of a train of continuous stirred tank reactors. The vinyl acetate and poly(alkyleneoxy)acrylate are fed to the first reaction vessel in which the mixture is purged with an inert gas such as nitrogen. A free radical initiator solution, for example t-butyl peroxypivalate dissolved in methanol, is combined with the above streams which are passed directly and continuously into the first reactor from which a stream of the polymerization mixture is continuously withdrawn.

The polymerization reaction mixture exiting the first reactor can be added to a second reactor together with additional initiator and additional poly(alkyleneoxy)acrylate in order to further increase the conversion of the initially added vinyl acetate.

Contemplated as the functional equivalent of vinyl acetate for purposes of this invention are the vinyl esters of formic acid and $C_3$–$C_{12}$ alkanoic acids.

Oxygen should, of course, be excluded during the polymerization. Such exclusion of oxygen is effectively achieved by employing a continuous polymerizer provided with a reflux condenser. Thus, when the polymerization reaction is performed continuously under reflux conditions, the polymerizer in effect becomes a system closed from the atmosphere.

The polymerization of the vinyl acetate and poly(alkyleneoxy) acrylate may be accomplished at temperatures ranging from 45°–130° C., the preferred temperature range being 55°–85° C. This temperature range will result in operating pressures in the range of 1–10 atm. Since the polymerization reaction is exothermic, the reaction is effected under reflux and/or with the aid of cooling means such as the cooling jacket for the polymerization reactor in order to control the temperature at the desired level.

The polymerization is normally performed in nonaqueous solutions, i.e. less than about 1 wt% water. The vinyl acetate stream and the poly(alkyleneoxy)acrylate stream can be diluted using $C_1$–$C_4$ aliphatic alcohols or other solvents such as the alkanoic esters of such alcohols which are inert to the polymerization initiator. Examples of suitable solvents are methyl acetate, ethyl acetate and the like with the preferred solvents being ethanol, propanol, butanol and especially methanol. A pure stream of any of the above solvents can be added continuously to the reactor.

Unpolymerized vinyl acetate is removed from the vinyl acetate/poly(alkyleneoxy)acrylate copolymer solution effluent from the last polymerization vessel in a stripping column in which methanol vapor is employed as the stripping agent. An inhibitor such as hydrazine, hydroquinone, sulfur or quinone or the like can be added to the effluent stream prior to the stripping column. The purpose of the inhibitor is to prevent polymerization from occuring in the stripping column. The overhead fraction from the stripping column comprising unpolymerized vinyl acetate and methanol may be passed to a recovery system or, preferably, recycled to the polymerization process.

The bottom effluent from the stripping column comprises a solution of vinyl acetate/poly(alkyleneoxy)acrylate copolymer in methanol. This solution is passed directly to an alcoholysis system, particularly when the hydrolytic alcohol to be employed in the alcoholysis is methanol as will usually be the case.

The residence time in the polymerization reaction vessels, the monomer feed rate, the solvent concentrations, the initiator concentration and the polymerization temperature will generally be such that the monomer concentration in the polymerization reaction vessels will range from 2–85 wt%. As is well known to those skilled in the art, these variables will generally be controlled in accordance with the desired molecular weight of the vinyl acetate/poly(alkyleneoxy)acrylate copolymer intermediate which will comprise a random distribution of vinyl acetate and poly(alkyleneoxy)acrylate units along the copolymer backbone.

Any free radical initiator which is soluble in the reaction mixture and possesses the desired half-life at the temperatures to be used may be employed in effecting the polymerization. Suitable initiators would include organic peroxides such as t-butyl peroxypivalate, di(2-ethyl hexyl)peroxydicarbonate, t-butyl peroxyneodecanoate and 2-2'-azobisisobutyronitrile. The concentration of the initiator in the polymerization reaction mixture will normally range from 0.0001–2 wt%, the preferred concentration being 0.0001–0.5 wt%.

A small amount of an acid may be added to the vinyl acetate stream prior to the first reaction vessel in order to limit the transesterification reaction between vinyl acetate and the added alcohol solvent. This reaction results in the formation of acetaldehyde which, besides being a chain transfer agent, is detrimental to the final product color. Examples of suitable acids includes phosphorous acid, oxalic acid, citric acid, tartaric acid, with the preferred acids being phosphorous and tartaric acids. The concentration of such acids in the polymerization reaction mixture would typically range from 2–50 ppm with the preferred range being 5–25 ppm.

In general, it is preferred that the amount of poly(alkyleneoxy)acrylate combined with the vinyl acetate monomer to produce the copolymer be limited so as to yield the hydrolyzed copolymer containing about 2–50 wt% of the poly(alkyleneoxy)acrylate, i.e. about 0.01–13 mole%.

The above described continuous polymerization procedure will afford a substantially homogeneous random copolymer product as opposed to the product from a batch reaction process which is highly dependent upon the reactivity ratios of the monomers, the acrylate monomers being more reactive that the vinyl acetate. Thus a batch process would yield a polymer having an initial section rich in acrylate units (little vinyl acetate) and the opposite end essentially vinyl acetate units. Upon phase separation of polymeric molecules rich in each monomer into a heterogeneous mixture, the polymer sections rich in polymerized acrylate monomer will be deleterious to gas barrier properties.

A semi-continuous, or delay addition, process would yield a polymer with very broad molecular weight distribution and a high degree of grafting on the vinyl acetate backbone resulting in branched structures that decrease flow properties, i.e. the resin will have limited thermoplasticity.

The alcoholysis of the intermediate vinyl acetate/poly(alkyleneoxy)acrylate may be accomplished by any of the well-known procedures for the catalyzed alcoholysis of vinyl ester polymers. However, to prepare the copolymer products of the invention which are essentially free of acid and in which only the acyloxy portion of the vinyl acetate component is replaced wholly or partially by hydroxyl groups, basic alcoholysis should be employed. Although the method for preparing the vinyl acetate/poly(alkyleneoxy)acrylate copolymer intermediate under continuous polymerization conditions is preferred, the alcoholysis of such intermediate may be either batch or continuous process.

The patent literature describes various batch and continuous methods for the production of polyvinyl alcohols by the catalytic alcoholysis of polyvinyl esters. These methods are well applicable to the vinyl acetate/poly(alkyleneoxy)acrylate copolymers of the invention and include the batch method of U.S. Pat. No. 2,227,997.

The continuous method in U.S. Pat. No. 2,642,419 in which the reactants are continuously mixed, the reaction mixture is poured or cast onto a moving surface, e.g. the belt or conveyor where gelling occurs, and the gel is removed from the surface before syneresis occurs. Once removed from the belt, the product is cut into smaller particles, washed with methanol and dried. The continuous method in U.S. Pat. No. 2,734,048 employing a slurry type of alcoholysis may also be practiced in carrying out the alcoholysis step for the present invention. Since the methods of all the foregoing patents are well known, details thereof are incorporated by reference.

In general, ethanol or preferably methanol is used in the alcoholysis reaction at temperatures ranging from 20°-100° C., but most desirably 35°-65° C. The pressure is that which is sufficient to maintain liquid phase conditions.

The hydrolytic alcohol should be substantially anhydrous in that it does not contain more than 2 wt% and preferably not more than 0.2 wt% water. The alcohol content of the hydrolysis mixture should be such as to provide a suitable excess of the alcohol. Advantageously the alcohol used will be the same alcohol that was utilized for dissolving the vinyl ester in the production of the copolymer intermediate. The alcohol would generally constitute from about 30-90 wt%, preferably 35-75 wt%, of the alcoholysis reaction medium. Conversely, the solids content will generally be 10-70 wt%, preferably 25-65 wt% of the reaction mixture.

The by-product of the alcoholysis reaction will be the acetate ester of the hydrolytic alcohol. Such ester can be removed as it is formed during the alcoholysis or allowed to build up in the alcoholysis medium.

The alcoholysis catalyst can be any of the alkaline catalysts that are typically used, such as the alkali metal hydroxides and the alkali metal alcoholates. The alkali metal hydroxides, particularly sodium hydroxide, are especially preferred. The catalyst concentration in the alcoholysis mixture may range from about 0.05-10 wt% on polymer, but preferably 0.2-4 wt% on polymer.

The vinyl alcohol/vinyl acetate/poly(alkyleneoxy)acrylate copolymer product of this invention will contain vinyl alcohol, vinyl acetate and poly(alkyleneoxy)acrylate units randomly distributed along the copolymer backbone. These copolymers can be processed thermoplastically without any difficulty, for example, by molding, injection molding and extrusion. The copolymers are suitable for the preparation of any shaped articles, for example, plates, tubes, profiles, bottles, fibers and especially, sheets which are very easily soluble in water when $R^2$ is hydrogen or a $C_1$-$C_5$ alkyl group. This thermoplastic processability is surprising since unplasticized polyvinyl alcohol is not considered a thermoplastic polymer due to decomposition occurring prior to or simultaneously with melting. It is further surprising that the excellent barrier properties of the vinyl alcohol are retained to a large extent.

The following examples were conducted at atmospheric pressure using two 2 liter reaction vessels in series. The reaction vessels were equipped with a mechanical agitator, a condenser, nitrogen inlet and a feed control system. The monomer/comonomer mixture (feed I), the solvent/initiator mixture (feed II), and the tartaric acid/solvent solution (feed III) were placed in different feed tanks and fed to the first reactor at a fixed rate through a metering pump while comonomer (feed IV) was fed to the second reactor. The desired number average and weight average molecular weights were achieved by controlling residence time, methanol to vinyl acetate ratio and initiator concentration as is well known in the art. The exit stream from the second reactor was passed down through a colum filled with Raschig rings while methanol vapor was introduced in a countercurrent manner to remove any unreacted vinyl acetate which is condensed overhead. The stripping rate was conducted in a manner which reduced the vinyl acetate concentration in the intermediate copolymer solution to less than 0.07 wt%.

The alcoholysis was performed by feeding the copolymer solution and a 5 wt% sodium hydroxide solution in methanol through an in-line mixer and cast onto a belt where gelling occurred. The gel was removed from the belt, when the desired conversion was reached. Then it was cut into smaller particles, short-stopped with acetic acid, and washed with methanol.

The invention will be further illustrated by the following examples in which parts and percentages are by weight and feeds are in g/hr unless otherwise indicated.

EXAMPLE I

The ingredients shown in Table I were charged to the above-described polymerization system using the described feeds:

TABLE I

|  |  | VAC | HEM-10* | Initiator** | MeOH | Tartaric Acid |
|---|---|---|---|---|---|---|
| Initial Charge Reactor 1 | (g) | 230 | 4.0 | 0.12 | 1230 | 0.04 |
| Initial Charge Reactor 2 | (g) | 89 | 2 | 0.06 | 1350 | 0.02 |
| Feed I | (g/hr) | 440 | 9.2 | — | — | — |
| Feed II | (g/hr) | — | — | 0.12 | 120 | — |
| Feed III | (g/hr) | — | — | — | 65 | 0.01 |
| Feed IV | (g/hr) | — | 3.3 | — | — | — |

*Hydroxyethyl methacrylate (10 EO's) $CH_2=CH(CH_3)CO_2-(CH_2CH_2O)_{10}-H$
**Bis(2-ethylhexyl) peroxy dicarbonate The mixture in the reactors was purged with nitrogen and brought to reflux by circulating hot water through the reactor vessel jackets. After one hour the feeds were pumped into the respective reactors at a fixed rate until a steady condition in the system was reached in about 6 hours. The second reactor vessel effluent was introduced into the stripping operation at this point.

This stripped paste (28.0% solid) and 5.0% solution of NaOH were fed to a mixer using flow rates of 1085 g/min. and 49.8 g/min. respectively. The slab collected from the mixer was kept at 126° F. for 12.5 minutes, whereupon it was cut into small particles and added to a 0.5 wt% acetic acid/methanol solution, washed with methanol and dried. The properties of the alcoholysis product are described in Table VII.

EXAMPLE II

This copolymerization was carried out in the same manner described in Example I except that the feeds charged to the reaction vessels were as shown in Table II.

TABLE II

|  |  | VAC | HEM-10 | Initiator* | MeOH | Tartaric Acid |
|---|---|---|---|---|---|---|
| Initial Charge Reactor 1 | (g) | 526 | 22.4 | 0.25 | 1331 | 0.04 |
| Initial Charge Reactor 2 | (g) | 282 | 7.7 | 0.15 | 1441 | 0.02 |
| Feed I | (g/hr) | 400 | 22.4 | — | — | — |
| Feed II | (g/hr) | — | — | 0.46 | 150 | — |
| Feed III | (g/hr) | — | — | — | 107 | 0.01 |
| Feed IV | (g/hr) | — | 7.7 | — | — | — |

*t-butyl peroxypivalate

The stripped paste (43.0% solid) and 5.0% solution of NaOH were fed to a mixer using flow rates of 1005 g/min. and 127.2 g/min. respectively. The slab collected from the mixer was kept at 126° F. for 12.5 minutes, whereupon it was cut into small particles and added to a 0.5 wt% acetic acid/methanol solution, washed with methanol and dried. The properties of the alcoholysis product are described in Table VII.

EXAMPLE III

This copolymerization was carried out in the same manner as that described in Example I using a poly(ethyleneoxy)methacrylate copolymer containing about 20 ethyleneoxy units. The feeds were charged to the reaction vessels as shown in Table III.

TABLE III

|  |  | VAC | HEM-20* | Initiator** | MeOH | Tartaric Acid |
|---|---|---|---|---|---|---|
| Initial Charge Reactor 1 | (g) | 220 | 16.0 | 0.20 | 1230 | 0.04 |
| Initial Charge Reactor 2 | (g) | 80 | 8.0 | 0.10 | 1350 | 0.02 |
| Feed I | (g/hr) | 411 | 40.0 | — | — | — |
| Feed II | (g/hr) | — | — | 0.20 | 120 | — |
| Feed III | (g/hr) | — | — | — | 65 | 0.01 |
| Feed IV | (g/hr) | — | 13.0 | — | — | — |

*Hydroxyethyl methacrylate (20 EO's) $CH_2=CH(CH_3)CO_2—(CH_2CH_2O)_{20}—H$
**Bis(2-ethylhexyl) peroxy dicarbonate The stripped paste (36.2% solid) and 5.0% solution of NaOH were fed to a mixer using flow rates of 1011 g/min. and 96.3 g/min. respectively. The slab collected from the mixer was kept at 126° F. for 12.5 minutes, whereupon it was cut into small particles and added to a 0.5 wt% acetic acid/methanol solution, washed with methanol and dried. The properties of the alcoholysis product are described in Table VII.

EXAMPLE IV

This copolymerization was carried out in the manner as described in Example I except that a poly(propyleneoxy)methacrylate, also known as polypropylene glycol methacrylate (PPGM) was substituted for HEM-10. The feeds were charged to the rection vessels and feed reservoirs as shown in Table IV.

TABLE IV

|  |  | VAC | PPGM* | Initiator** | MeOH | Tartaric Acid |
|---|---|---|---|---|---|---|
| Initial Charge Reactor 1 | (g) | 228 | 11.4 | 0.37 | 1233 | 0.04 |
| Initial Charge Reactor 2 | (g) | 88 | 4.4 | 0.45 | 1354 | 0.02 |
| Feed I | (g/hr) | 433 | 21.6 | — | — | — |
| Feed II | (g/hr) | — | — | 0.35 | 223 | — |
| Feed III | (g/hr) | — | — | — | 74 | 0.01 |
| Feed IV | (g/hr) | — | 13.1 | — | — | — |

*$CH_2=C(CH_3)CO_2—[CH_2CH(CH_3)O]_{4-5}—H$
**t-butyl peroxypivalate

The stripped paste (35.2% solid) and 5.0% solution of NaOH were fed to a mixer using flow rates of 888 g/min. and 152.2 g/min. respectively. The slab collected from the mixer was kept at 126° F. for 12.5 minutes, whereupon it was cut into small particles and added to a 0.5 wt% acetic acid/methanol solution, washed with methanol and dried. The properties of the alcoholysis product are described in Table VII.

EXAMPLE V

This copolymerization was carried out in the same manner as that indicated in Example I, except that Igepal 880 methacrylate (I880M) was substituted for HEM-10, and the feeds were charged to the reaction vessels and feeds reservoirs as shown in Table V.

The Igepal 880 methacrylate monomer was prepared by reacting Igepal CO-880 surfactant from GAF Corp., a nonylphenoxy poly(ethyleneoxy)ethanol, with methacryloyl chloride generally following the procedure of Example I in U.S. Pat. No. 4,075,411.

TABLE V

|  |  | VAC | I880M* | Initiator** | MeOH | Tartaric Acid |
|---|---|---|---|---|---|---|
| Initial Charge Reactor 1 | (g) | 228 | 4.6 | 0.06 | 1233 | 0.04 |
| Initial Charge Reactor 2 | (g) | 88 | 1.7 | 0.04 | 1352 | 0.02 |
| Feed I | (g/hr) | 440 | 9.2 | — | — | — |
| Feed II | (g/hr) | — | — | 0.09 | 120 | — |
| Feed III | (g/hr) | — | — | — | 500 | 0.06 |
| Feed IV | (g/hr) | 10 | 3.3 | — | — | — |

*$CH_2=C(CH_3)CO_2—[CH_2CH_2O]_{30}—C_6H_4—C_9H_{19}$
**t-butyl peroxypivalate

The stripped paste (20.9% solid) and 5.0% solution of NaOH were fed to a mixer using flow rates of 940 g/min. and 48.3 g/min. respectively. The slab collected from the mixer was kept at 126° F. for 12.5 minutes, whereupon it was cut into small particles and added to a 0.5 wt% acetic acid/methanol solution, washed with methanol and dried. The properties of the alcoholysis product are described in Table VII.

EXAMPLE VI

This copolymerization was carried out in the manner as that indicated in Example I, except that lauryloxyethyl methacrylate [LEM-25] was substituted for HEM-10, and the feeds were charged to the rection vessels and feed reservoirs as shown in Table VI.

TABLE VI

|  |  | VAC | LEM-25* | Initiator** | MeOH | Tartaric Acid |
|---|---|---|---|---|---|---|
| Initial Charge Reactor 1 | (g) | 526 | 22.4 | 0.25 | 1331 | 0.04 |
| Initial Charge Reactor 2 | (g) | 283 | 7.7 | 0.15 | 1441 | 0.02 |
| Feed I | (g/hr) | 400 | 22.4 | — | — | — |
| Feed II | (g/hr) | — | — | 0.46 | 150 | — |
| Feed III | (g/hr) | — | — | — | 107 | 0.01 |
| Feed IV | (g/hr) | — | 7.7 | — | — | — |

*$CH_2=C(CH_3)CO_2—[CH_2CH_2O]_{25}—C_{12}H_{23}$
**t-butyl peroxypivalate

The stripped paste (43.0% solid) and 5.0% solution of NaOH were fed to a mixer using flow rates of 1005 g/min. and 127.2 g/min. respectively. The slab collected from the mixer was kept at 126° F. for 12.5 minutes, whereupon it was cut into small particles and added to a 0.5 wt% acetic acid/methanol solution, washed with methanol and dried. The properties of the alcoholysis product are described in Table VII.

TABLE VII

| Copolymer | $\overline{Mw}^c$ | Mole % (wt. %) Acrylate | Mole % PVOH | Mole % VAC | M.P. (°C.) | Melt Index[d] | O.T.[f] |
|---|---|---|---|---|---|---|---|
| I | 72,000 | 1.61 (20) | 95.3 | 3 | 240 | 0.7 | 3.1 |

TABLE VII-continued

| Copolymer | $\overline{Mw}^c$ | Mole % (wt. %) Acrylate | Mole % PVOH | Mole % VAC | M.P. (°C.) | Melt Index$^d$ | O.T.$^f$ |
|---|---|---|---|---|---|---|---|
| II | 45,000 | 1.61 (20) | 93.38 | 5 | 230 | 4.5 | 2.5 |
| III | 70,000 | 1.85 (40) | 94.1 | 4 | 240 | 1.2 | 3.8$^g$ |
| V-107$^a$ | 36,000 | 0 | 98.2 | 1.8 | Decomposed | 4.1$^e$ | |
| WS-42$^b$ | 77,000 | 0 | 97 | 3 | Decomposed | No flow | |
| IV | 62,000 | 2.21 (20) | 97 | 0.79 | | 3.2 | 3.4 |
| V | 72,000 | 0.56 (20) | 98.5 | 0.94 | | 0.2 | |
| VI | 45,000 | 0.672 (20) | 98.5 | 0.83 | | 3.8 | 1.5 |

$^a$Vinol 107 is a 98–98.8% hydrolyzed polyvinyl alcohol marketed by Air Products and Chemicals, Inc.
$^b$WS-42 is a 96–98% hydrolyzed polyvinyl alcohol marketed by Air Products and Chemicals, Inc.
$^c$Weight average molecular weight
$^d$ASTM D 1238-82 standard test
$^e$Sample was severely decomposed.
$^f$Oxygen Transmission at 90% RH [cc/100 in$^2$/day/mil atm]
$^g$Water cast film The melting points for the copolymers listed in Table VII were determined by RMS-605 mechanical spectrometer (Rheometrics). It can be seen from the data in Table VII that the polyvinyl alcohol/poly(alkyleneoxy)methacrylate copolymers of the invention did not decompose at their melting points and possessed melt indices that were suitable for extrusion.

In order to provide thermoplastically processed articles having an oxygen transmission at 90% relative humidity of less than about 4 cc/100 in$^2$/day/mil atm, the vinyl alcohol copolymer according to general formula I should have n=5 to 50, x=95–99, y=0–5 and z=0.005–3. Employing processes and equipment well known in the art, a layer of the vinyl alcohol copolymer can be used for packaging articles and materials such as bottles, containers, sheets, thin films and the like for foods, medicines and other oxygen sensitive substances. Such articles may be multi-layered, at least one of which comprises a vinyl alcohol copolymer of the invention.

STATEMENT OF INDUSTRIAL APPLICATION

The invention provides a vinyl alcohol/poly(alkyleneoxy)acrylate copolymer which can be thermoplastically processed by molding, injection molding and melt extrusion into shaped articles possessing good gas barrier properties.

We claim:

1. A substantially homogeneous random vinyl alcohol copolymer comprising the following general structure:

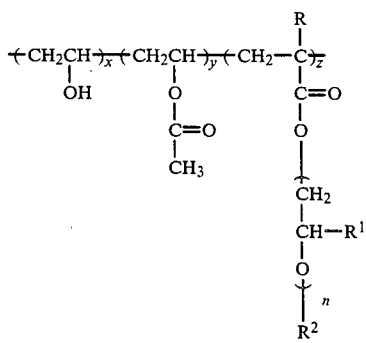

wherein
R is hydrogen or methyl;
R$^1$ is hydrogen or methyl;
R$^2$ is hydrogen, C$_1$–C$_{20}$ alkyl, C$_6$–C$_{20}$ aryl or C$_7$–C$_{30}$ alkylaryl;
n is a number from 1–1,000; provided n is not 1 when R$^2$ is hydrogen, methyl or ethyl;
x is 50–99.9 mole%;
y is 0–50 mole%; and
z is 0.001–50 mole%.

2. The copolymer of claim 1 in which R is methyl.
3. The copolymer of claim 1 in which n is 3–100.
4. The copolymer of claim 1 in which n is 5–50.
5. The copolymer of claim 1 in which x is 75–99.5 mole%, y is 0–25 mole% and z is 0.005–25 mole%.
6. The copolymer of claim 1 in which x is 85–99 mole%, y is 0–15 mole% and z is 0.005–15 mole%.
7. The copolymer of claim 2 in which x is 75–99.5 mole%, y is 0–25 mole% and z is 0.005–25 mole%.
8. The copolymer of claim 2 in which x is 85–99 mole%, y is 0–15 mole% and z is 0.005–15 mole%.
9. The copolymer of claim 1 in which R$^2$ is hydrogen.
10. A substantially homogeneous random vinyl alcohol copolymer consisting essentially of the following general formula

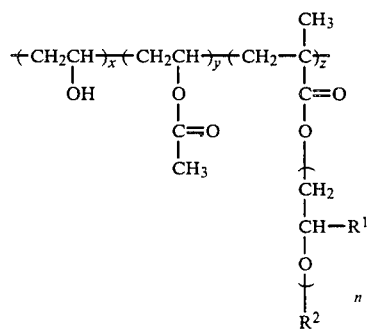

wherein
R$^1$ is hydrogen or methyl;
R$^2$ is hydrogen or a C$_1$–C$_{20}$ alkyl;
n is a number from 3–100;
x is 75–99.5 mole%;
y is 0–25 mole%; and
z is 0.005–25 mole%.
11. The copolymer of claim 10 in which R$^2$ is a C$_4$–C$_{12}$ alkyl group.
12. The copolymer of claim 10 in which R$^1$ is hydrogen.
13. The copolymer of claim 10 in which R$^2$ is hydrogen.
14. The copolymer of claim 10 in which R$^1$ and R$^2$ are hydrogen.

15. The copolymer of claim 10 in which x is 85-99 mole%, y is 0-15 mole% and z is 0.005-15 mole%.

16. The copolymer of claim 10 in which n is 5-50.

17. A substantially homogeneous random vinyl alcohol copolymer consisting essentially of the following general formula

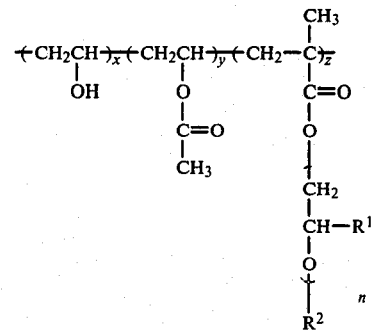

wherein
$R^1$ is hydrogen or methyl;
$R^2$ is hydrogen or a $C_4$-$C_{12}$ alkyl group;
n is a number from 5-50;
x is 85-99 mole%;
y is 0-15 mole%; and
z is 0.005-15 mole%.

18. The copolymer of claim 17 in which $R^1$ is hydrogen.

19. The copolymer of claim 17 in which $R^2$ is hydrogen.

* * * * *